United States Patent [19]
Mattern et al.

[11] Patent Number: 5,383,498
[45] Date of Patent: Jan. 24, 1995

[54] CYLINDER RUPTURE VESSEL WITH CYLINDER ROTATION MECHANISM AND RUPTURE MECHANISM

[75] Inventors: Charles C. Mattern, Clermonte; Dan A. Nickens, Windermere, both of Fla.

[73] Assignee: Earth Resources Corporation, Ocoee, Fla.

[21] Appl. No.: 165,692

[22] Filed: Dec. 13, 1993

[51] Int. Cl.⁶ .................. B65B 31/00; B67B 7/24
[52] U.S. Cl. ........................ 141/1; 141/51; 141/4; 141/329; 141/97; 222/83.5; 222/87; 83/177
[58] Field of Search ............ 141/51, 65, 329, 330, 141/1, 4, 5, 97; 222/83.5, 86, 397, 87; 83/177

[56] References Cited

U.S. PATENT DOCUMENTS

| | | | |
|---|---|---|---|
| 1,591,932 | 7/1926 | Young . | |
| 2,496,606 | 2/1950 | Smith . | |
| 2,905,050 | 5/1961 | Schwacha | 83/177 |
| 3,333,735 | 8/1967 | Odasso | 222/5 |
| 3,746,256 | 7/1973 | Hall et al. . | |
| 3,983,756 | 10/1976 | Danguillier et al. . | |
| 3,993,221 | 11/1976 | Boynton et al. | 222/87 |
| 4,112,797 | 9/1978 | Pearl | 83/177 |
| 4,166,481 | 9/1979 | Farris et al. | 141/1 |
| 4,312,254 | 1/1982 | Pearl | 83/177 |
| 4,620,466 | 11/1986 | Jumel et al. | 83/177 |
| 4,690,180 | 9/1987 | Gold | 141/51 |
| 4,944,333 | 7/1990 | Gold et al. | 141/51 |
| 4,966,317 | 10/1990 | Barr . | |
| 5,035,269 | 7/1991 | Pytryga et al. . | |
| 5,114,043 | 5/1992 | Collins, Jr. | 222/86 |
| 5,163,585 | 11/1992 | Campbell . | |
| 5,186,219 | 2/1993 | Gold et al. | 141/51 |
| 5,269,352 | 12/1993 | Gold | 141/51 |
| 5,303,749 | 4/1994 | Stock et al. | 141/4 |

FOREIGN PATENT DOCUMENTS

| | | | |
|---|---|---|---|
| 1607991 | 12/1967 | Germany | 141/51 |

OTHER PUBLICATIONS

PCT Int'l Search Report, PCT/US93/04099.
"Specifications for Chemical Control Site Gas Cylinder Removal", US Army Corps of Engineers, Jun. 1987.
"Supplement C to Project Eagle—Phase II Demilitarization and Disposal Of The M34 Cluster At Rocky Mountain Arsenal Final Plan (Feb. 1973)", Jul. 1975.
"Emergency Containment System," Pytrga, F. G., pp. 43–46 (no date).
"Instruction Manual for Model 5502 Emergency Response Containment Vessel," Solkatronic, Oct. 1990.
Memo, New Jersey State Department of Environmental Protection, Feb. 4, 1982, two pages.
"No Known Treatment For Accident Victims," *Sunday Times,* Trenton, N.J., Feb. 28, 1982, p. 87.
"This Stuff Is Getting To All of Us!, " *Five Engineering,* Apr. 1983, pp. 21, 25–28.
"Poison Spills Impact Remains," *Richmond Times-Dispatch,* Mar. 16, 1983, pp. A1–A2.
"Something Out of a Space Movie," *Richmond Times–Dispatch,* Feb. 1982, pp. A1–A2.
"Pentaborane Release, Environmental Laboratories, Hanover County, VA," National Response Team Briefing Mar. 1982, pp. 1–2.
Memo, CECOS International, Inc. to Environmental Emergency Branch, Mar. 17, 1982, pp. 1–5.

*Primary Examiner*—Ernest G. Cusick
*Attorney, Agent, or Firm*—Baker & Botts; James G. Gatto

[57] ABSTRACT

A cylinder rupture vessel rotates the cylinder during the rupturing process by using at least one driven roller assembly supported on a plurality of bearing surfaces. A rupture mechanism punctures the container and, when used in combination with the roller assembly, the cylinder is cut into sections. The rupture mechanism may be a water laser, a milling tool, a plasma cutting tool, a lathe tool, or at least one cutting wheel. Relative movement between the rupture mechanism and the bearing surfaces is achieved by a plurality of actuators. Treatment or decontamination of contents may be performed in the cylinder rupture vessel.

33 Claims, 5 Drawing Sheets

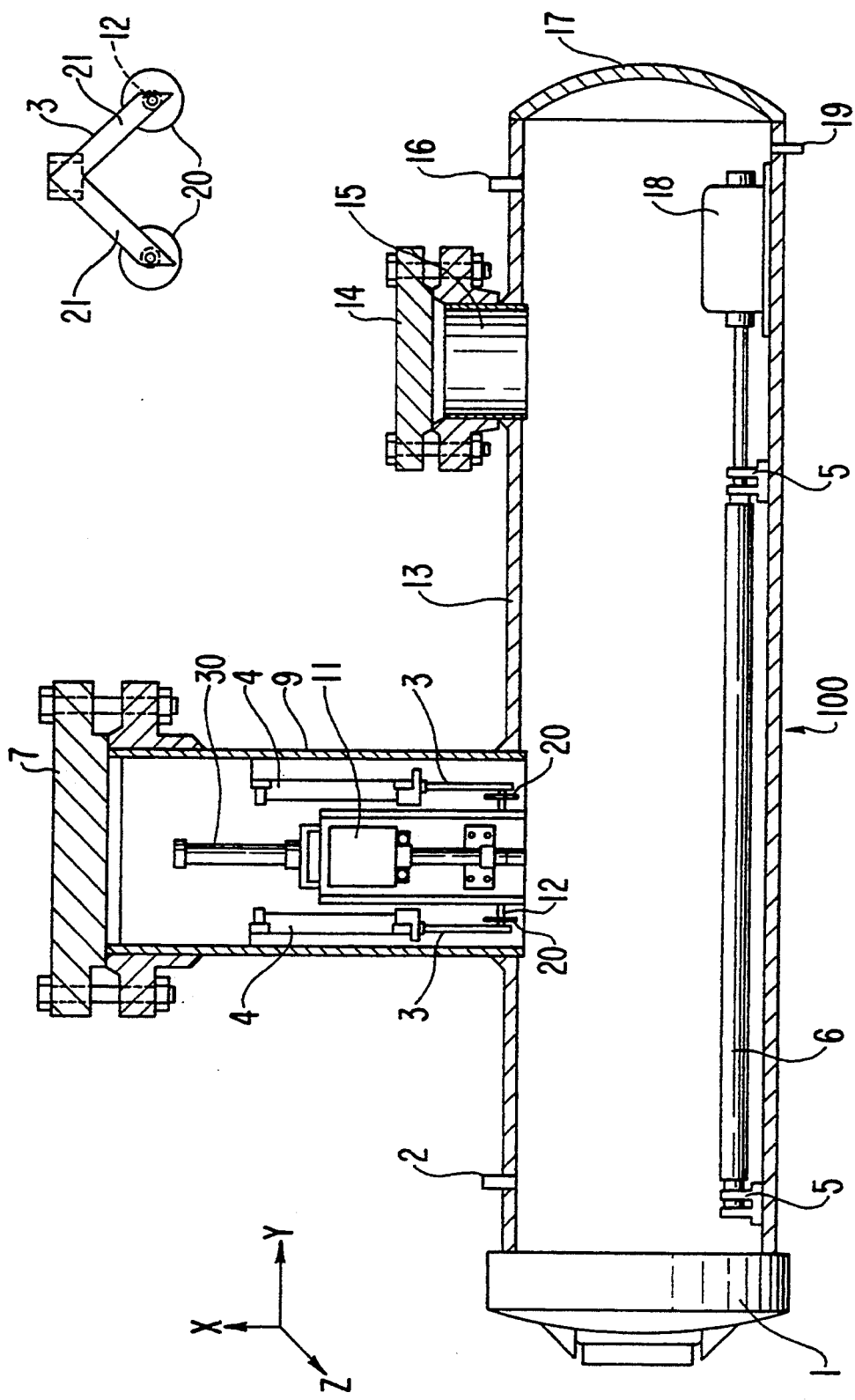
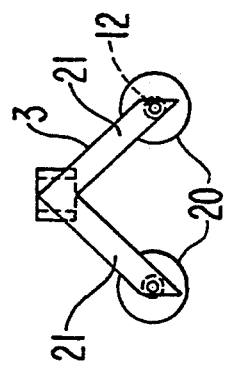
FIG. 1
FIG. 2

CYLINDER RUPTURE VESSEL WITH CYLINDER ROTATION MECHANISM AND RUPTURE MECHANISM

BACKGROUND OF THE INVENTION

1. Field of the Invention

This invention relates to the field of cylinder rupture vessels and more particularly to cylinder rupture vessels used for the safe withdrawal and/or recontainerization of both gaseous and liquid phases of material released from the cylinder or other container.

2. Related Art

Cylinder rupture vessels (CRVs), such as disclosed, for example, in U.S. Pat. Nos. 5,186,219, 4,944,333 and RE 33,799, enable access to cylinders (for example, cylinders with inoperable valves), munitions, drums or other containers, containing either known or unknown substances, in a controlled environment. For simplicity, the term "container" will be used herein broadly to refer to cylinders, munitions, drums or other containers (pressurized or not) that are or may be processed in a CRV. The general structure and operation of a CRV is described, for example, in the aforementioned patents. Briefly, a CRV generally comprises a sealed chamber with an access door for enabling a container to be located therein on a support surface. A sealing mechanism is provided to seal the chamber. Inlet and outlet ports are typically provided for creating a vacuum and/or introducing inert gas into the CRV and for purging air and inert gas from the container.

A rupture mechanism is typically provided for gaining access to the inside of the container. This has been done in the past by rupturing a wall of the container using a puncture mechanism such as a punch, spike, drill or saw or by puncturing the container near the valve to remove the valve. The term "rupture" is broadly understood to mean gaining access to the interior of the container, whether by puncturing or otherwise penetrating a wall or portion of the container. In prior art CRV's, often the container is held stationary by clamps or other securing mechanisms. It is also known to invert the container after rupturing to facilitate removal of its contents, especially when those contents are liquids.

Water lasers, in general, are also known. One such water laser is disclosed in U.S. Pat. No. 5,184,434. Generally speaking, a water laser is a device which typically provides an ultra-high pressure, low-flow water jet. The jet may comprise water (or some other liquid, e.g., a gelatinous solution) in combination with small abrasive particles. The high pressure of the water jet, and if desired, the abrasive particles, allow for the cutting of metal without the generation of a great deal of heat. The abrasive particles may be aluminum oxide, silicon carbide, or other known abrasives. Typically, a water laser system includes a water container, an intensified water pump to pressurize the water to an ultra-high level such as, for example, 35,000—60,000 psi, a flexible hose and a nozzle. The nozzle may combine the abrasives with the ultra-high-pressure water in a known manner to form an ultra-high speed cutting jet and may be controlled to direct the jet. The cutting jet, with or without abrasive(s), is able to cut even hard materials such as metals, alloys, composites or glass without inducing thermal or deformation stresses and typically does not change the metallurgy of the material being cut. Water lasers are commercially available and have been used to cut various types of containers in the open, but are believed not to have been used in a cylinder rupture vessel.

In the prior art, once a container is ruptured, typically the contents are transferred to a second container for treatment. Treatment generally involves using a treatment reagent to neutralize or convert the contents to a less hazardous form. For example, if the contents are acidic, they may be treated in a second container with a caustic solution to be neutralized. Similarly, acidic or oxidizing reagents may be used. Such forms of treatment are generally well known. After the contents are treated, the container is typically decontaminated. Typically, this requires that both the ruptured container and the second container be decontaminated. Decontamination usually occurs after most of the contents have been removed and involves treating the residual matter, dissolving it in a solution, or flushing it away, for example. The use of two containers requires steps which are unnecessary.

SUMMARY OF THE INVENTION

It is an object of this invention to provide an improved cylinder rupture vessel.

It is another object of the present invention to provide a cylinder rupture vessel with an improved rupture mechanism.

It is another object of the present invention to provide a cylinder rupture vessel which enables relative movement (for example, rotational or translational) between the rupture mechanism and a target container.

It is another object of the invention to provide a CRV that enables access to the contents of a container and permits both treatment of the contents and decontamination of the container in the cylinder rupture vessel.

According to one preferred embodiment, a cylinder rupture vessel is provided with a water laser which acts as a rupture mechanism to puncture the container and permit access to the contents of a container located within the CRV. Alternatively, the rupture mechanism may be a drill incorporating an end mill tool or a lathe cut-off tool. With either embodiment, a mechanism may be provided to cause relative movement between the container and the rupture mechanism. Among other things, this enables the container to be cut into sections, if desired. Methods of operating a CRV with these rupture mechanisms are also disclosed. Alternatively, a plasma cutting tool may be used.

Other objects and advantages of the present invention will be apparent from the description of the preferred embodiments when read in conjunction with the drawings.

BRIEF DESCRIPTION OF THE DRAWINGS

FIG. 1 is a side sectional view of one embodiment of a cylinder rupture vessel according to the present invention.

FIG. 2 is a side view of one embodiment of a roller/cutter mechanism.

DETAILED DESCRIPTION OF THE PREFERRED EMBODIMENTS

Figure 3:
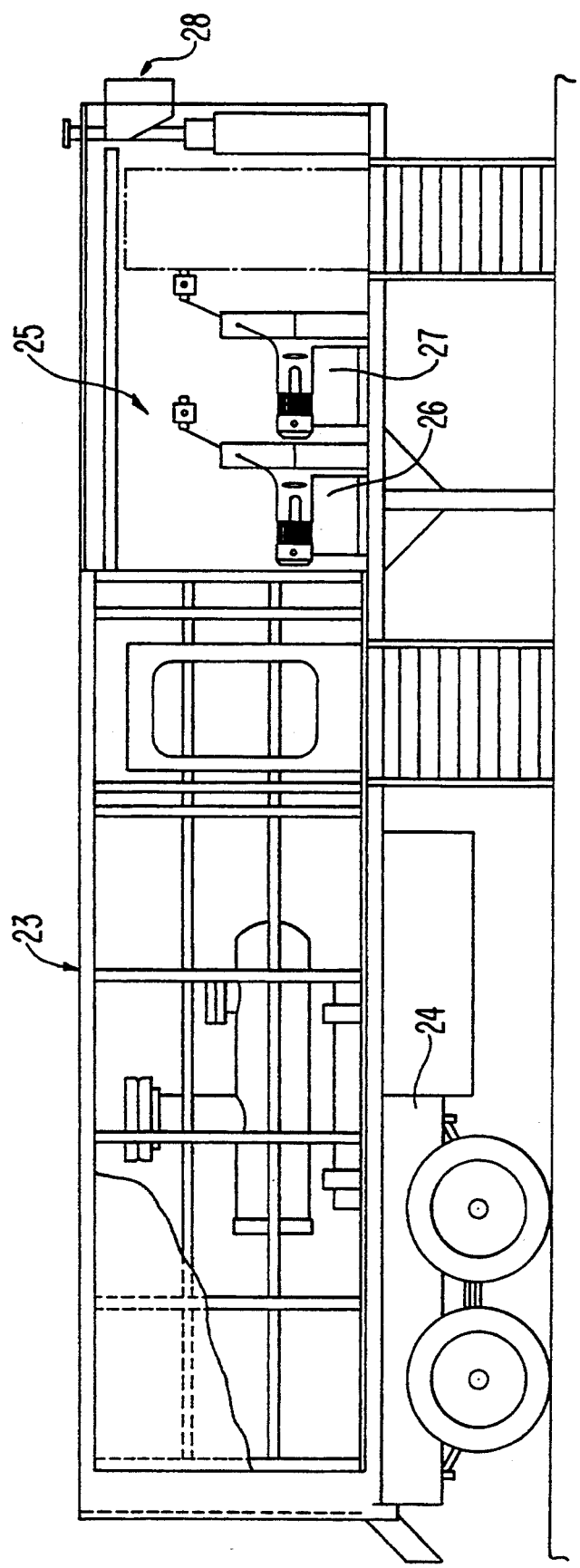
FIG. 3 is a side sectional view showing the cylinder rupture vessel disposed within a semi-van.

With reference to FIG. 1, there is shown a cylinder rupture vessel, designated generally as 100, comprising a first upper housing portion 9, a second upper housing portion 15, and a lower housing portion 13.

First upper housing portion 9 houses a rupture mechanism, generally indicated by reference numeral 11. The upper end of first upper housing portion 9 is preferably sealed by a blind flange 7. Preferably, rupture mechanism 11 is substantially entirely located within first upper housing portion 9. Rupture mechanism 11 is preferably extendable and retractable to enable it to be moveable into and out of lower housing portion 13 so that rupture mechanism 11 can be positioned adjacent to the container to be ruptured. Hydraulically activated piston 30 raises and lowers rupture mechanism 11. One or more hydraulic access ports (not shown) or hydraulic fluid line connections may be provided in a known manner in a side wall of the first upper housing portion 9 for supplying hydraulic fluid to rupture mechanism 11, piston 30 and various components of the CRV (as further described below). If desired, rupture mechanism 11 may also be movable laterally, rotationally and/or longitudinally with respect to the container, in which case, an actuator or plurality of actuators or other known structure(s) would effect the appropriate movement.

Second upper housing portion 15 preferably extends vertically upward from the lower housing portion 13. A second pressure vessel (not shown) may be placed in fluid communication with rupture vessel 100 through second upper housing portion 15 to increase the effective available volume of the cylinder rupture vessel system. Alternatively, it may isolated by a pressure relief device such as a burst disk which would permit communication between the vessels when there is an overpressure situation (e.g. greater than the pressure which can be accommodated by the pressure relief device) in the primary vessel. Second upper housing portion 15 is preferably sealed by a blind flange 14 when rupture vessel 100 is not in communication with a second pressure vessel.

Lower housing portion 13 is normally sealed but is provided with door 1 for accessing the interior of lower housing portion 13 during loading and removal of a target container. Lower housing portion 13 is also preferably provided with one or more inlet and outlet ports, shown for example as elements 2 and 16 in FIG. 1. Through inlet and outlet ports 2, 16, a vacuum may be created or inert gas, liquid solvent or reactant (e.g., gas or liquid to neutralize the contents) introduced. In addition, through inlet and outlet ports 2, 16, air and other fluids are purged or evacuated from the CRV. The inlet ports may be configured as a nozzle to create a spray to increase the coverage of the liquid being introduced into the system. This spray may be used to rinse the inside of the ruptured container or the cylinder rupture vessel itself. The nozzle may be controlled to enable movement with respect to the cylinder and/or CRV to facilitate treatment and/or decontamination of these structures.

Figure 4:
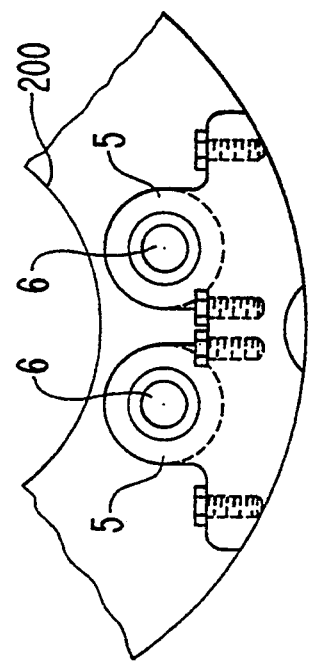
FIG. 4 is a partial front sectional view of one embodiment of a rotating mechanism.

With reference to FIG. 4 in conjunction with FIG. 1, a pair of rollers 6 is provided in the lower housing portion 13. Rollers 6 preferably extend in the longitudinal direction of the CRV (from left to right in FIG. 1). Rollers 6 form a bearing surface for supporting a target container and are preferably supported by pillow block bearings 5 which may be mounted to lower housing 13. Rollers 6 are preferably made of steel, but may comprise high-performance synthetics such as rubber or a synthetic resin polymer sold under the trademark (TEFLON), depending on the contents of the container being processed. Rollers 6 preferably have a diameter of about 2.5 inches. Rollers 6 may be mechanically driven, for example, by motor 18, to cause a target container located thereon to rotate about its longitudinal axis. In addition, rollers 6 or any other support surface(s) provided for target container 200 may be capable of longitudinal, vertical and/or latitudinal movement with respect to rupture mechanism 11 by use of one or more linear actuators or other known mechanisms.

As depicted in FIG. 4, a portion of a target container 200 is supported by rollers 6. Rollers 6 are preferably rotated at about 100 revolutions per minute. However, a range of less than one to 150 revolutions per minute may also preferably be used, depending in part on the application and type of rupture mechanism 11.

Rollers 6 may be driven while rupture mechanism 11 is operating so that target container 200 may be cut into sections. For example, by rotating target container 200 while operating rupture mechanism 11, target container 200 may be cut in two. Also, by rotating target container 200 after gaining access to its interior, drainage of any liquids from the cylinder is facilitated. Motor 18 is preferably reversible so that clockwise or counter-clockwise rotation of rollers 6 is possible.

Figure 5:
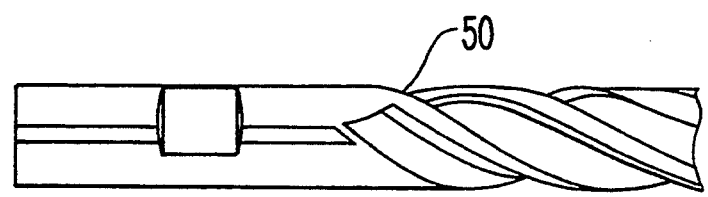
FIG. 5 depicts an end mill tool rupture mechanism.

Rupture mechanism 11 may be specially designed to perform the sectional cutting function. For example, rupture mechanism 11 may be a flat-tipped end mill tool 50 (FIG. 5). Optionally, end mill tool 50 may have a pointed end. Milling tools in general are well known and various types of milling tools may be used. However, the single-end, four-flute end mill (non-center cutting type) of FIG. 5 is preferred. Such an end mill is available from McMaster-Carr. The sides of end mill tool 50 are preferably shaped so that by rotating the container while end mill tool 50 is also rotating, a groove may be cut circumferentially about target container 200.

A lathe cut-off tool or other similar tool may also be used as rupture mechanism 11. Such a tool may be used either to puncture the container or, alternatively, by continued rotation of the tool and by rotation of rollers 6 and/or rollers 20, target container 200 may be cut into two sections. The removal of a section of target container 200 allows for easier drainage of the contents of target cylinder 200 and access to its interior. This is particularly useful, for example, when it is desirable to flush the interior of target container 200.

Figure 6:
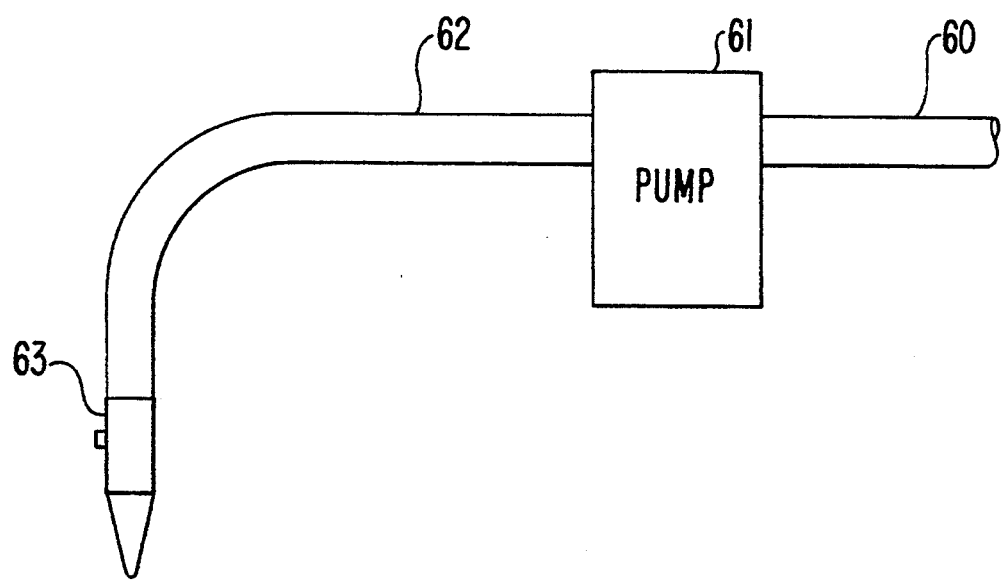
FIG. 6 is a schematic representation of a water laser system rupture mechanism.

According to another preferred embodiment, rupture mechanism 11 may comprise a water laser assembly. Referring to FIG. 6 in conjunction with FIG. 1, the water laser assembly preferably comprises a water source 60, a high pressure pump 61, a supply line 62 (e.g., a flexible hose) and a nozzle 63. Nozzle 63 is preferably located in first upper housing portion 9 and is movable into and out of lower housing portion 13 by hydraulic piston 30. In operation, nozzle 63 is preferably positioned about one inch (1") above the surface of target container 200, however, distances from a fraction of an inch to a few inches or more may also be used. It is also within the scope of the preferred embodiment to employ an actuator which moves nozzle 63 relative to the container. For example, nozzle 63 might be positioned at an angle inclined with respect to target container 200.

In addition to being extendable towards and retractable from target container 200, nozzle 63 is preferably rotatable with respect to target container 200. In this way, nozzle 63 may be used to more fully and easily flush the interior of target container 200. During the flushing operation, the water laser assembly may be operated at a lower pressure and may be provided with a different liquid, solution or other fluid. Therefore, water pump 61 associated with the water laser assembly may be operable to generate a lower pressure water jet. Alternatively, a second water pump (not shown) may be provided to generate the lower pressure water jet. Further, nozzle 63 may comprise a multi-port nozzle or a plurality of nozzles oriented in a plurality of directions to expedite the flushing of target container 200. The flushing may be performed to treat the contents of the container, decontaminate the container and/or decontaminate the CRV, among other things.

In addition, rollers 6 may be rotated during the cutting process. After the container is cut in two, nozzle 63 may then access the interior of target container 200. Nozzle 63 may also be longitudinally and/or laterally movable with respect to target container 200. Other liquids, solutions or other fluids may be introduced into the container through the nozzle 63 or a similar mechanism to treat the contents of the container without transfer to a separate container. According to this significant advantage of the invention, this mechanism enables the contents of a container to be accessed, the contents to be treated and the container to be decontaminated in a single structure. This increases the efficiency of the operation significantly by avoiding unnecessary transfer and decontamination steps. Additionally, rollers 6 or other support structures may be tilted by a linear actuator to further enhance the ability of the container to be flushed. All of the rotation and moveable parts are preferably hydraulically powered and may be provided from the hydraulic supply. If desired, pneumatic or other types of power may be used to power some or all of the components.

As shown in FIG. 3, preferably the CRV 100 and water laser assembly are disposed in a containment room 23 of a semi-van 24 or other mobile structure. One or more hydraulic pumps 26 and 27 are remotely provided, for example, within storage area 25 of semi-van 24. Hydraulic pump 26 may provide the power necessary to operate the water laser in a manner known in the art. Hydraulic pump 27 may be used to provide power to other operations of the cylinder rupture vessel such as pistons 4 disposed in first upper housing portion 9. Preferably, the hydraulic fluid is provided to the pump(s) 26, 27 via sealed, stainless steel tubing. Optionally, the tubing may be sealed in containment room 23. The hydraulic fluid used by pumps 26, 27 is preferably a perflourinated hydrocarbon, for example, a chlorotrifluorethylene, or other nonreactive fluid, so that, should a leak occur within the CRV, the hydraulic fluid will not react with anything it contacts.

The water laser used may be any type of known water laser system. Water supply 60 (FIG. 6) and high-intensity water pump 61 are preferably located externally and remotely of the CRV. The pressurized water generated by high-intensity water pump 61 is then supplied to nozzle 63. The water laser preferably provides a high-pressure cutting jet to penetrate the container. For example, a jet of 35,000–60,000 psi, with a flow rate of 6 gallons per minute may be used. Other flow rates from less than 1 gallon per minute to 20 gallons per minute may also be used depending on the circumstances. Nozzle 63 provides ultra-high-pressure water, with or without abrasives, to form a cutting jet. By using the water laser in combination with a rotation mechanism, the container may be cut into sections. Other types of fluids may be used other than water.

According to another aspect of the invention, the CRV may be filled or partially filled with a fluid that surrounds or partially surrounds target container 200. For example, the fluid may be water, a caustic solution, a neutralizing solution or other fluids having desired characteristics depending on the contents of the target container. Water lasers can be used to cut in submersed environments, for example, under water. When the target container is submersed, a pump recycles and/or regenerates the water from the water laser. Processing (e.g., filtering or other treatment) of the recycled water and emersion fluid may also be performed as the combined water and fluid is recycled.

In the foregoing embodiments, rotation of target container 200 may additionally or alternatively be effected by a hydraulic roller assembly located in or near the first upper housing portion 9. Again, with reference to FIG. 1, the hydraulic roller assembly preferably includes a pair of hydraulic pistons 4, one end of which is attached to a hydraulic actuator (not shown) and the other end of which is attached to a roller support assembly, for example, a V-shaped clamp 3 (FIG. 2). V-shaped clamp 3 preferably has a pair of arms 21, each supporting a roller 20. Piston 4 raises and lowers rollers 20 for contact with the target cylinders.

Rollers 20 are preferably steel, but may comprise high-performance synthetics such as robber or a synthetic resin polymer sold under the trademark (TEFLON), depending on the contents of the container being processed. Rollers 20 preferably have a diameter of about 2.5 inches and are preferably hydraulically driven and affixed to V-shaped clamp 3 with pin 12. For example, hydraulic supply lines (not shown) connected to a hydraulic supply source (not shown) may extend along each leg member 21 to respective hydraulic rollers 20. Other drive mechanisms may also be used for rollers 20. For example, a motor similar to motor 18 or a smaller motor may be used. Rollers 20 preferably rotate but at least assist in rotating the container about its longitudinal axis.

Figure 7:
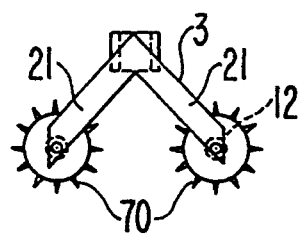
FIGS. 7 and 7a are side views of rotating cutting mechanism according to alternative preferred embodiments.
Figure 7A:
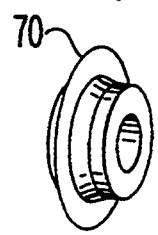

According to another preferred embodiment, hydraulic rollers 20 may comprise a cutting wheel 70 having a sharp edge as shown in FIG. 7 which puncture the surface of target container 200, with or without rotation of target container 200. Preferably, in this embodiment, the roller 20 operates like a can opener by penetrating the container with the sharp edge with sufficient force.

If desired, a rupture mechanism 11 (for example, a punch, drill, spike, etc.) may be used in combination with cutting wheels 70. Cutting wheels 70 may be hydraulic and are preferably rotated by the hydraulic fluid within the hydraulic supply lines extending along the legs of V-shaped clamp 3. Cutting wheels 70 are preferably of the type used to cut tubes and pipes. Such cutting wheels are commercially available from McMaster Carr. Cutting wheels 70 preferably puncture the surface of target container 200 without producing fragments from the surface of target container 200, since such fragments might be reactive with the contents of target container 200. If both cutting wheels 70 and rollers 6 are driven, the rotation speed of cutting wheels 70 is preferably synchronous with that of rollers 6.

Figure 8:
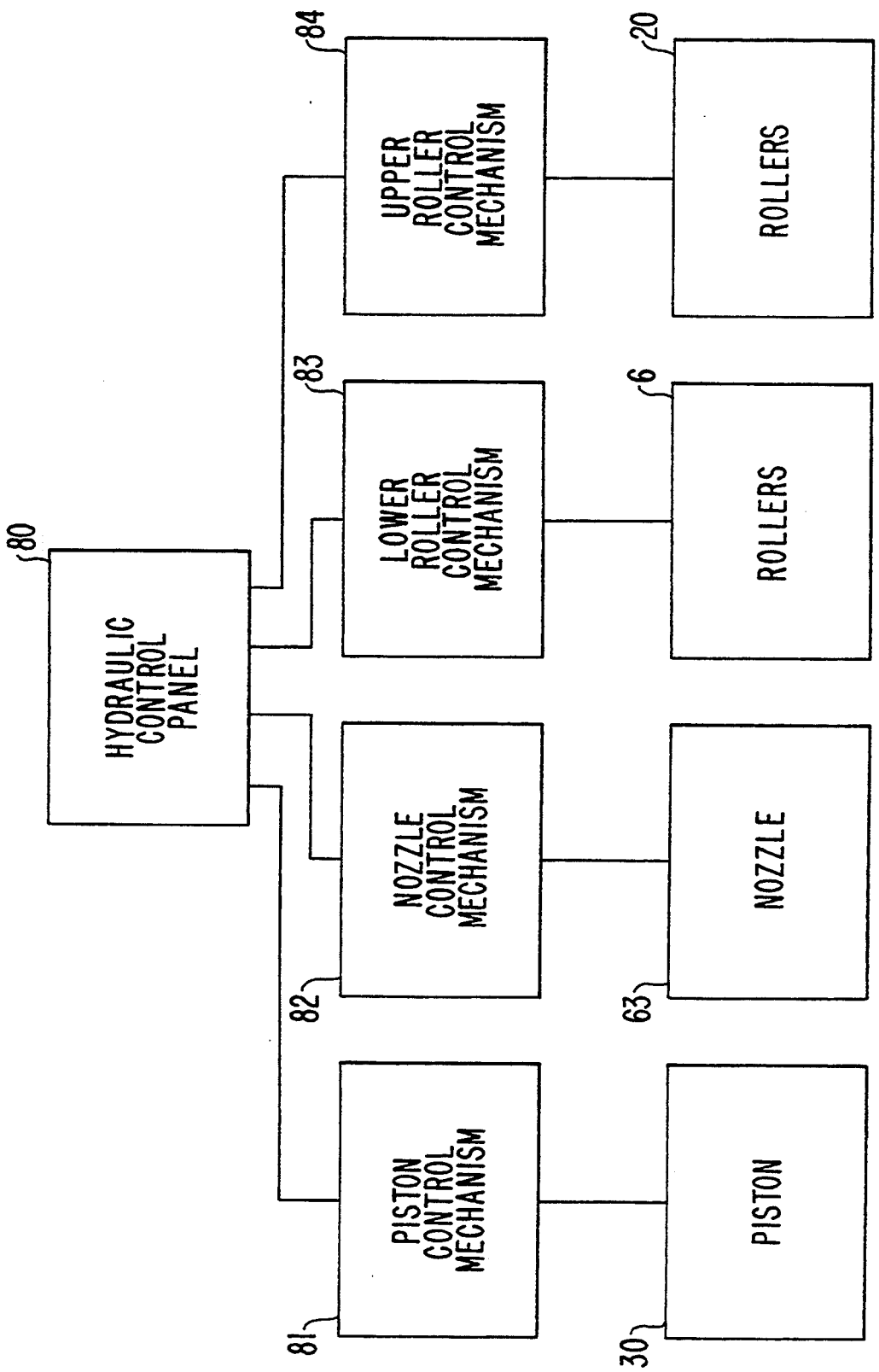
FIG. 8 is a block diagram of a hydraulic control system for a rupture mechanism and rollers according to one of the preferred embodiments.

A block diagram of the elements which may be used to facilitate water laser cutting and/or flushing of target container 200 is depicted in FIG. 8. A hydraulic control panel 80 is connected to piston control mechanism 81, nozzle control mechanism 82, lower roller control mechanism 83 and upper roller control mechanism 84. Control panels for controlling the hydraulics of devices, pumps and/or actuators are generally well known. Remote control panels for CRV's are also well known. The control of the various hydraulic mechanisms, pumps, etc. is also well known. Hydraulic control panel 80 may also be connected to other control mechanisms for controlling other devices in the CRV.

Piston control mechanism 81 connects to piston 30 in first upper housing portion 9 to control the movement into and out of lower housing portion 13 of rupture mechanism 11. Nozzle 63 may additionally be moved rotationally so as to position nozzle 63 in any desired arrangement relative to target container 200 by nozzle control mechanism 82. Nozzle control mechanism 82 is preferably operable to direct nozzle 63 in any angle within lower housing portion 13. Alternatively, nozzle control mechanism 82 may be replaced by a planar Y-Z nozzle control mechanism which moves nozzle 63 planarly within lower housing portion 13 while maintaining a substantially vertical alignment of nozzle 63. Various combinations of nozzle control mechanisms are also within the scope of the preferred embodiments.

Lower rollers 6 are controlled by lower roller control mechanism 83 which preferably moves rollers 6 laterally (Z direction in FIG. 1) and/or longitudinally (Y direction in FIG. 1) and/or vertically (X direction in FIG. 1) within lower housing portion 13. As such, rollers 6 may be moved relative to nozzle 63 whereby target container 200, resting on rollers 6, is also moved relative to nozzle 63. In addition, lower roller control mechanism 83 is preferably operable to vertically raise one end of rollers 6 in the X direction to tilt target container 200 disposed thereon. Tilting target container 200 facilitates removal of the contents therein.

Upper roller control mechanism 84 may be provided to control the movement of rollers 20 into and out of lower housing portion 13 as well as in any direction (X, Y, Z) within lower housing portion 13. By moving rollers 20 within lower housing portion 13, targets containers of various sizes may be rotated.

As indicated, the hydraulic control of the various components of this system enable target container 200 to be moved in any direction relative to nozzle 63. Likewise, nozzle 63 may be moved in any direction relative to target container 200. According to this preferred embodiment, target container 200 is more easily ruptured and flushed due to the variability provided. Relative movement between target container 200 and nozzle 63 may therefore be accomplished by either movement of target container 200 relative to nozzle 63, movement of nozzle 63 relative to target container 200 or both. Consequently, an operator of the CRV can determine the most advantageous orientation and relative movement necessary to rupture and flush target container 200.

Figure 9:
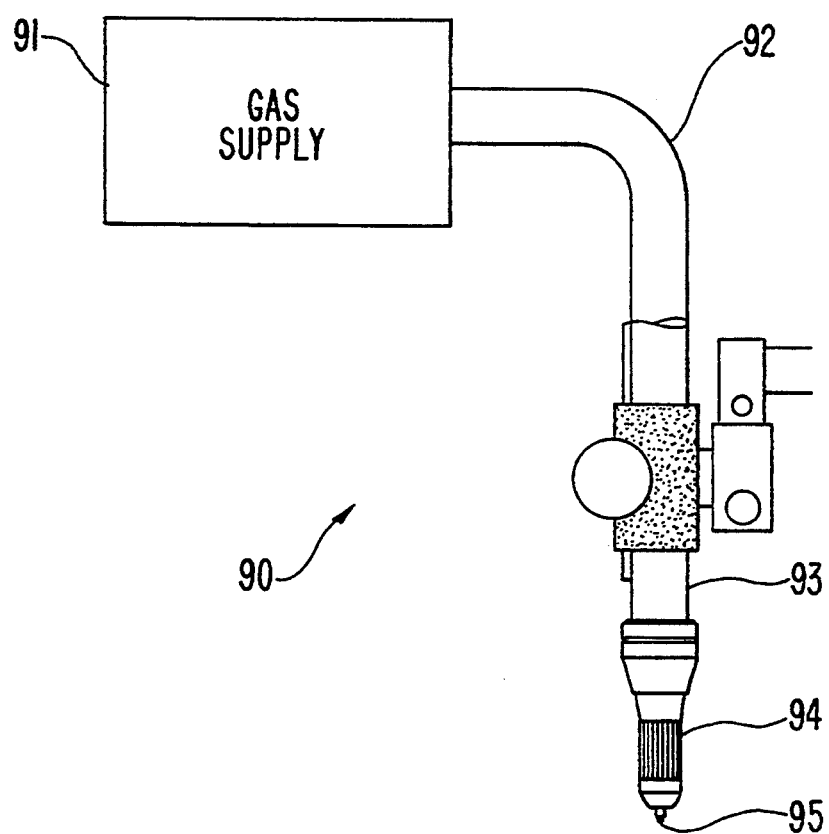
FIG. 9 is a schematic representation of a plasma cutting tool according to one of the preferred embodiments of the present invention.

Although a water laser has been disclosed, other types of lasers may also be employed. For example, a $CO_2$ laser operating at about 50 KWatts may be employed. Additionally, a plasma cutting tool 90 (FIG. 9) may also be used for rupture mechanism 11. Plasma cutting tool 90 comprises a gas supply 91, gas line 92 and a torch 93, whereby torch 93 heats the gas to an extremely high temperature. A nozzle 94 in torch 93 directs the heat through a thin hole 95 to concentrate the heat on the surface of target container 200. The surface of target container 200 is thereby melted and the contents of the target container evacuated.

Although a detailed description of the preferred embodiments has been provided, the scope of the invention is not limited thereby. Various changes and modifications within the scope of the invention will be readily apparent by those skilled in the art as defined by the appended claims.

What is claimed is:

1. In a cylinder rupture vessel comprising an enclosed chamber and a laser, a method of gaining access to the interior of a target container comprising the steps of:
   locating a target container in the enclosed chamber;
   sealing the enclosed chamber;
   activating the laser; and
   causing relative movement between the target container and the laser to enable the laser to remove a section of the target container.

2. The method of claim 1 further comprising the step of treating the contents of the target container while the target container is located in the cylinder rupture vessel.

3. The method of claim 1 further comprising the step of decontaminating the target container while the target container is located in the cylinder rupture vessel.

4. The method of claim 1 further comprising the step of treating the contents of the target container and decontaminating the target container while the target container is located in said cylinder rupture vessel.

5. In a cylinder rupture vessel comprising an enclosed chamber and a water laser, a method of gaining access to the interior of a target container comprising the steps of:
   locating a target container in the enclosed chamber;
   sealing the enclosed chamber;
   activating the water laser; and
   causing relative movement between the target container and the water laser to enable the water laser to remove a section of the target container.

6. The method of claim 5 further comprising the step of treating the contents of the target container while the target container is located in the cylinder rupture vessel.

7. The method of claim 5 further comprising the step of decontaminating the target container while the target container is located in the cylinder rupture vessel.

8. The method of claim 5 further comprising the step of treating the contents of the target container and decontaminating the target container while the target container is located in said cylinder rupture vessel.

9. In a cylinder rupture vessel comprising an enclosed chamber and a rupture mechanism, a method of gaining access to the interior of a target container comprising the steps of:
  locating a target container in the enclosed chamber;
  sealing the enclosed chamber;
  immersing the target container in a fluid;
  activating the rupture mechanism so that the rupture mechanism and the target container are operatively engaged with one another; and
  rotating the target container.

10. The method of claim 9 wherein the rupture mechanism comprises a water laser.

11. The method of claim 9 further comprising the step of treating the contents of the target container while the target container is located in the cylinder rupture vessel.

12. The method of claim 9 further comprising the step of decontaminating the target container while the target container is located in the cylinder rupture vessel.

13. The method of claim 9 further comprising the step of treating the contents of the target container and decontaminating the target container while the target container is located in said cylinder rupture vessel.

14. The method of claim 9 wherein the rupture mechanism comprises a laser.

15. A cylinder rupture vessel comprising:
  an enclosed chamber;
  a support surface comprising rotation means for supporting and rotating a target container disposed within said enclosed chamber;
  means for sealing said enclosed chamber; and
  a rupture mechanism for gaining access to the contents of the target container wherein said rupture mechanism comprises a water laser.

16. The cylinder rupture vessel of claim 15 wherein said water laser comprises a nozzle disposed at least partially within said enclosed chamber.

17. The cylinder rupture vessel of claim 16 further comprising means for causing relative movement between said nozzle and the target container.

18. The cylinder rupture vessel of claim 15 further comprising means for treating the contents of the target container while said contents are in said cylinder rupture vessel.

19. The cylinder rupture vessel of claim 15 further comprising means for decontaminating the target container while the target container is located in said cylinder rupture vessel.

20. The cylinder rupture vessel of claim 15 further comprising means for treating the contents of the target container and decontaminating the target container while the target container is located in said cylinder rupture vessel.

21. A cylinder rupture vessel system comprising:
  an enclosed chamber for receiving a target container;
  a support for supporting the target container within said enclosed chamber; and
  water laser means for producing a high-pressure jet of water to gain access to the contents of the target container.

22. The cylinder rupture vessel of claim 21 wherein said water laser means comprises a nozzle disposed at least partially within said enclosed chamber.

23. The cylinder rupture vessel of claim 12 further comprising means for causing relative movement between said nozzle and said support.

24. The cylinder rupture vessel of claim 21 further comprising means for treating the contents of said target container while said contents are in said cylinder rupture vessel.

25. The cylinder rupture vessel of claim 21 further comprising means for decontaminating said target container while said target container is located in said cylinder rupture vessel.

26. The cylinder rupture vessel of claim 21 further comprising means for treating the contents of said target container and decontaminating said target container while said target container is located in said cylinder rupture vessel.

27. A cylinder rupture vessel for gaining access to the contents of a target container, said cylinder rupture vessel comprising:
  an enclosed chamber;
  a support surface for supporting the target container within said enclosed chamber;
  means for sealing said enclosed chamber; and
  a laser for gaining access to the contents of the target container.

28. The cylinder rupture vessel of claim 27 wherein said laser comprises a water laser.

29. The cylinder rupture vessel of claim 27 wherein said water laser comprises a nozzle disposed at least partially within said enclosed chamber.

30. The cylinder rupture vessel of claim 27 further comprising means for causing relative movement between said-nozzle and the target container.

31. The cylinder rupture vessel of claim 27 further comprising means for treating the contents of the target container while the contents are in said cylinder rupture vessel.

32. The cylinder rupture vessel of claim 27 further comprising means for decontaminating the target container while the target container is located in said cylinder rupture vessel.

33. The cylinder rupture vessel of claim 27 further comprising means for treating the contents of the target container and decontaminating the target container while the target container is located in said cylinder rupture vessel.

* * * * *